United States Patent [19]
Morris, Jr.

[11] Patent Number: 5,439,694
[45] Date of Patent: Aug. 8, 1995

[54] POULTRY PREPARATION PROCESS AND APPARATUS

[75] Inventor: William F. Morris, Jr., Raleigh, N.C.

[73] Assignee: Morris & Associates, Inc., Raleigh, N.C.

[21] Appl. No.: 272,539

[22] Filed: Jul. 11, 1994

[51] Int. Cl.⁶ ............................ A23B 4/00; A23L 1/00
[52] U.S. Cl. ...................................... 426/511; 99/470; 99/477; 99/483; 426/521; 452/198
[58] Field of Search ............... 426/511, 510, 521, 524; 99/467, 470, 477, 483; 452/188, 198

[56] References Cited

U.S. PATENT DOCUMENTS

| | | | |
|---|---|---|---|
| 2,060,423 | 11/1936 | McKee et al. | 426/511 |
| 3,092,975 | 6/1963 | Zebarth | 452/198 |
| 4,255,459 | 3/1981 | Glen | 426/521 |
| 4,547,383 | 10/1985 | Goldhahn | 426/524 |
| 4,563,364 | 1/1986 | Carmichael et al. | 426/510 |
| 4,933,200 | 6/1990 | Shimizu | 426/510 |
| 5,104,352 | 4/1992 | Dransfield | 452/198 |
| 5,281,428 | 1/1994 | Morgan | 426/312 |

OTHER PUBLICATIONS

Dawson et al., *Incidence and Control of Microorganisms on Poultry Products*, Nov., 1979.

Primary Examiner—George Yeung
Attorney, Agent, or Firm—Popham, Haik, Schnobrich & Kaufman, Ltd.

[57] ABSTRACT

A method and apparatus is shown for subjecting animal carcasses immediately after slaughter and evisceration to residence for a specific time period in a steam chamber for the purpose of preheating the skin of the carcasses to assist in controlling the moisture absorption of the carcasses in a chiller as well as for sterilization of the carcasses to kill harmful bacteria on all exposed surfaces of the eviscerated carcasses.

4 Claims, 1 Drawing Sheet

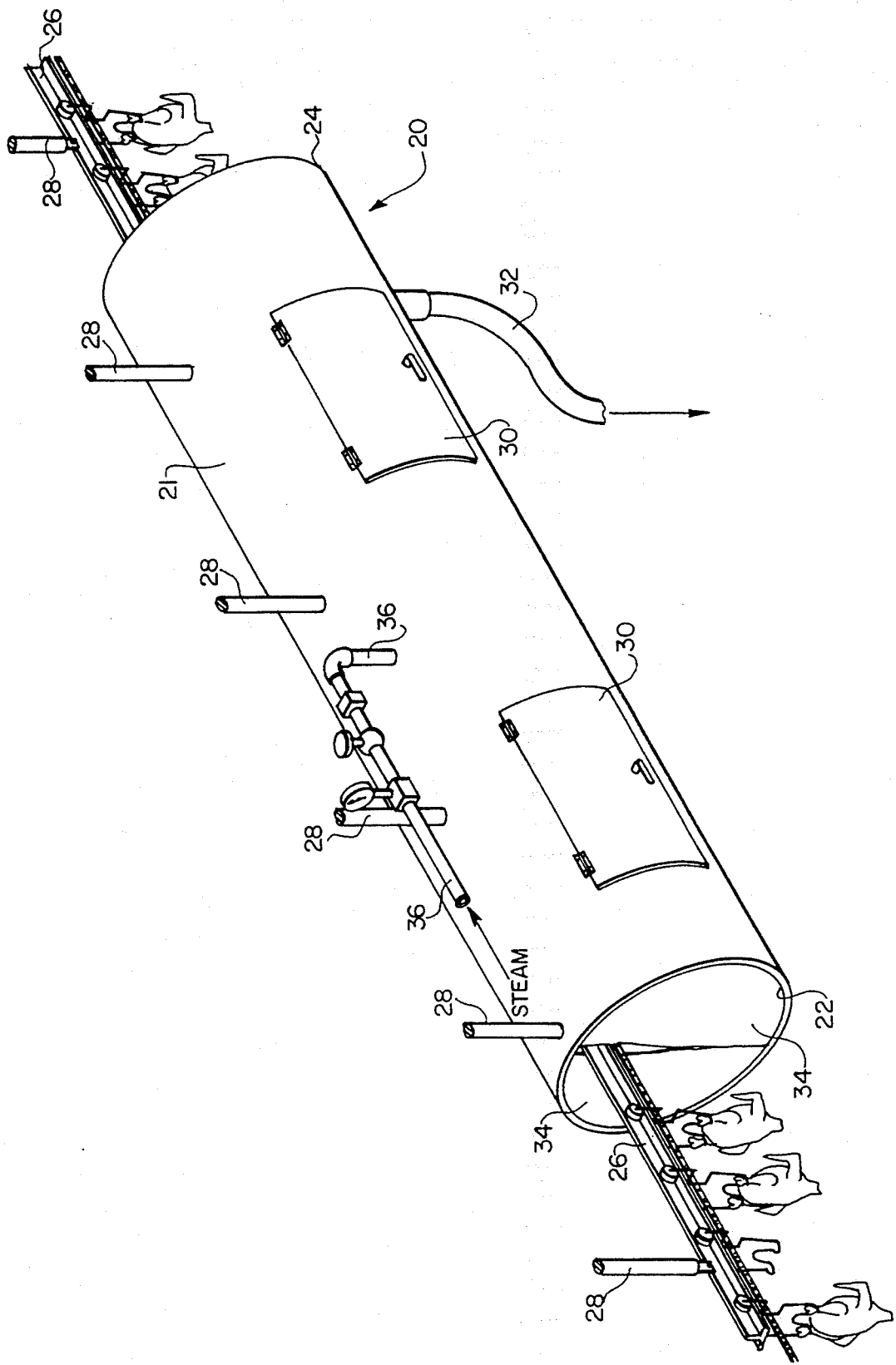

POULTRY PREPARATION PROCESS AND APPARATUS

BACKGROUND OF THE INVENTION

1. Field of the Invention

The present invention relates to processes and apparatuses for preparing poultry and other meat products prior to human consumption. More specifically, the invention relates to a method and a device for assisting in the control of moisture absorption of animal carcasses during the chilling of the carcasses as well as sterilization of the carcasses prior to the chilling procedure.

2. Related Art

It has been a long established practice and is now universally adopted as standard procedure in the industry to chill poultry in a cold water bath after evisceration to reduce the body temperature of the eviscerated birds as rapidly as possible from approximately 100° F. to below 40° F. to meet USDA requirements as described in U.S. Pat. Nos. 3,004,407, 3,250,086 and 3,410,101. It is also common knowledge that these carcasses absorb a certain amount of moisture during the chilling process. The amount of moisture that may be absorbed by any particular size and type of bird is specifically limited by the USDA to assure that this practice is not abused. Therefore, it is of special concern to the processing plant that this "moisture pick up" be controlled as closely to that specified by the USDA as possible without the danger of exceeding the maximum which could cause the product to be impounded by the USDA for 24 hours or until the moisture was within limits.

It has also been generally recognized that the temperature of the skin of the carcass along with the amount of agitation that the bird received during the chilling process has a great deal of influence on the amount of moisture picked up. In recognition of this fact, the USDA places a maximum allowable temperature limit on the water temperature in the chiller of 60° F.

In a similar manner it is a well established fact that controlling the skin temperature of the bird as it enters the picker greatly influences the ease and effectiveness of the picking operation, which is accomplished by passing the birds through a scalder with carefully controlled temperature immediately prior to the picking operation and in certain cases to even go through a second scalding operation for certain hard to pick areas such as the necks.

SUMMARY OF THE INVENTION

This invention relates to a method and apparatus for preheating the skin and all exposed surfaces of poultry or other animal carcasses immediately before the carcasses are immersed in a chiller to precondition the skin of the carcasses in order to help control the moisture absorption of the carcasses during the chilling process.

Preheating the animal carcasses prior to immersion in a chiller produces an effect similar to the effect of a scalder prior to picking. When poultry products are scalded prior to picking the heat relaxes the muscles in the skin that hold the feathers in. When relaxed, these muscles release their grip on the feathers so that the feathers may be removed more easily by the picking machines. Similarly, the preheating of poultry products in a steam chamber tends to relax the muscles in the skin to allow the pores of the skin to open prior to immersion in the chiller resulting in a greater moisture uptake in less time and providing for greater control of moisture absorption in conjunction with the control of the chilling process itself. In view of the fact that the birds are going through a steam preheating chamber for preheating to facilitate greater control of the moisture absorption process, an opportunity is also presented to accomplish at the same time the sterilization of these birds to minimize bacteriological contamination.

Salmonella bacteria contamination is of particular concern to parties interested in or involved with the poultry industry. While salmonella contamination can occur internally in the body and bloodstream of the animals, the subject of primary concern to the slaughter and processing plant is in the nature of external or surface contamination on the carcass of the animal as it is processed. If this external or surface contamination can be minimized, a major part of the contamination problem will be solved. It is a well documented fact that salmonella bacteria is killed by heat at a temperature in excess of 150° F. for a duration of approximately 7 seconds or more. This inventive apparatus and process proposes a means for accomplishing such heat sterilization at an opportune point in the processing procedure for animal carcasses and with minimum alteration of the current processing procedure. This is accomplished by heat sterilizing the animal carcasses at the same time that the carcasses are preheated prior to entering the chiller in order to aid in moisture absorption. In a preferred embodiment of the present invention poultry products being processed on an eviscerating line while being transported on an overhead track-type conveyor line are subsequently passed through an enclosed chamber into which live steam is injected at atmospheric pressure after the final wash of the eviscerated poultry products and before emersion of the poultry products in a chiller.

BRIEF DESCRIPTION OF THE DRAWINGS

The invention is better understood by reading the following Detailed Description of the Preferred Embodiments with reference to the accompanying drawing figure, in which like reference numerals refer to like elements throughout, and in which:

FIG. 1 is a perspective view of the overhead, track-type conveyor line and steam chamber that make up the subject inventive apparatus.

DETAILED DESCRIPTION OF THE PREFERRED EMBODIMENTS

Referring initially to FIG. 1, a preferred embodiment of the present invention is shown including a substantially cylindrical steam chamber 20 having a first opening 22 at a first end and a second opening 24 at a second end. Steam chamber 20 is positioned substantially horizontally and an overhead track-type conveyer line 26 enters steam chamber 20 through first opening 22 and passes through the steam chamber 20 along an uppermost portion of steam chamber 20 and parallel to the central axis of steam chamber 20, exiting at second opening 24. Track support rods 28 pass through the outer shell 21 of steam chamber 20 at spaced intervals, extending into the uppermost portion of steam chamber 20 and providing means for supporting conveyer line 26 within steam chamber 20. A plurality of access doors 30 are hingedly connected to a side wall portion of outer shell 21 of steam chamber 20 for closing off openings through outer shell 21 of steam chamber 20 provided to allow access to the interior of steam chamber 20.

A drain line 32 leads from an opening through a bottom portion of steam chamber 20 and provides means for draining condensate accumulated within steam chamber 20 during the processing of the animal carcasses. Rubber doors 34 are provided over first opening 22 and second opening 24. Animal carcasses are suspended from conveyer line 26 by shackles or meat hooks spaced at intervals along conveyer line 26. Carcasses being moved along conveyer line 26 enter steam chamber 20 through rubber door 34 located over first opening 22. Live steam is injected into steam chamber 20 through steam line 36 at pressures equal to or above atmospheric. This live steam contacts all exposed surfaces of the animal carcasses suspended from conveyer line 26 as the carcasses pass through steam chamber 20. Sensors and an electronic solenoid valve can be provided to cut off steam provided through steam line 36 whenever conveyer line 26 stops moving. This feature ensures that the animal carcasses will not be exposed to the steam for a period of time greater than the period of time determined to be effective for killing all surface salmonella bacteria on the carcasses and for preheating the carcasses in order to facilitate moisture absorption during the subsequent chilling process.

In an alternative embodiment steam chamber 20 can be eliminated and live steam can be directed at carcasses suspended from conveyer line 26 by positioning a plurality of steam lines 36 along a portion of conveyer line 26. Conveyer line 26 can be provided as a continuation of the processing line carrying the animal carcasses from means for eviscerating the carcasses and leading to subsequent processing steps including immersion in chilled water and final packaging of the processed meat products.

Placement of steam lines 36 and steam chamber 20 along conveyer line 26 allows for inclusion of the present inventive method and apparatus at a convenient point in existing processing procedures and lines with a minimum alteration of current processing procedures. The steam serves to preheat the poultry products as well as to sterilize all external surfaces of the poultry products prior to emersion in a chiller where moisture absorption is maximized as a result.

What is claimed is:

1. A method of preparing poultry including the steps of
    a) suspending slaughtered and eviscerated poultry carcasses from an overhead, track-type conveyor line;
    b) moving said carcasses along said conveyor line and through flexible rubber doors placed at openings to an enclosed chamber;
    c) moving said carcasses into said chamber through one of said doors and retaining said carcasses in said chamber for a predetermined length of time;
    d) injecting live steam of at least atmospheric pressure into said chamber so as to contact all exposed surface areas of said carcasses with said live steam for said predetermined length of time; and
    e) moving said carcasses out of said chamber through another of said doors and into cold water for chilling and moisture absorption.

2. The method of claim 1 wherein said carcasses are moved continuously along said conveyer line and wherein said conveyer line forms a portion of a continuous processing line for preparing said poultry for sale to consumers.

3. A method of preparing poultry including the steps of
    a) suspending slaughtered and eviscerated poultry carcasses from an overhead, track-type conveyor line;
    b) moving said carcasses along said conveyer line and into an area having live, atmospheric steam directed at said carcasses so that said carcasses are exposed to said steam for a predetermined length of time, and
    c) moving said carcasses along said conveyor line away from said area and into chilled water for chilling and moisture absorption.

4. An apparatus for assisting in moisture absorption by poultry products and for sterilizing all external surface areas of said poultry products, wherein said apparatus comprises:
    an overhead, track-type conveyer line;
    means for suspending slaughtered and eviscerated poultry carcasses from said conveyor line;
    means for moving said poultry carcasses along said conveyer line;
    an elongated, substantially enclosed chamber;
    said conveyer line passing through said chamber, entering said chamber through a first opening and exiting said chamber through a second opening;
    flexible rubber doors being provided for sealing closed said first and second openings and for allowing passage of said poultry carcasses;
    means for injecting live steam of at least atmospheric pressure into said chamber; and
    means for shutting off said injection of live steam when said poultry carcasses are not moving along said conveyer line.

* * * * *